Jan. 13, 1925.
G. B. WADSWORTH
1,522,926
ELECTRIC TERMINAL CABINET
Filed Aug. 7, 1922
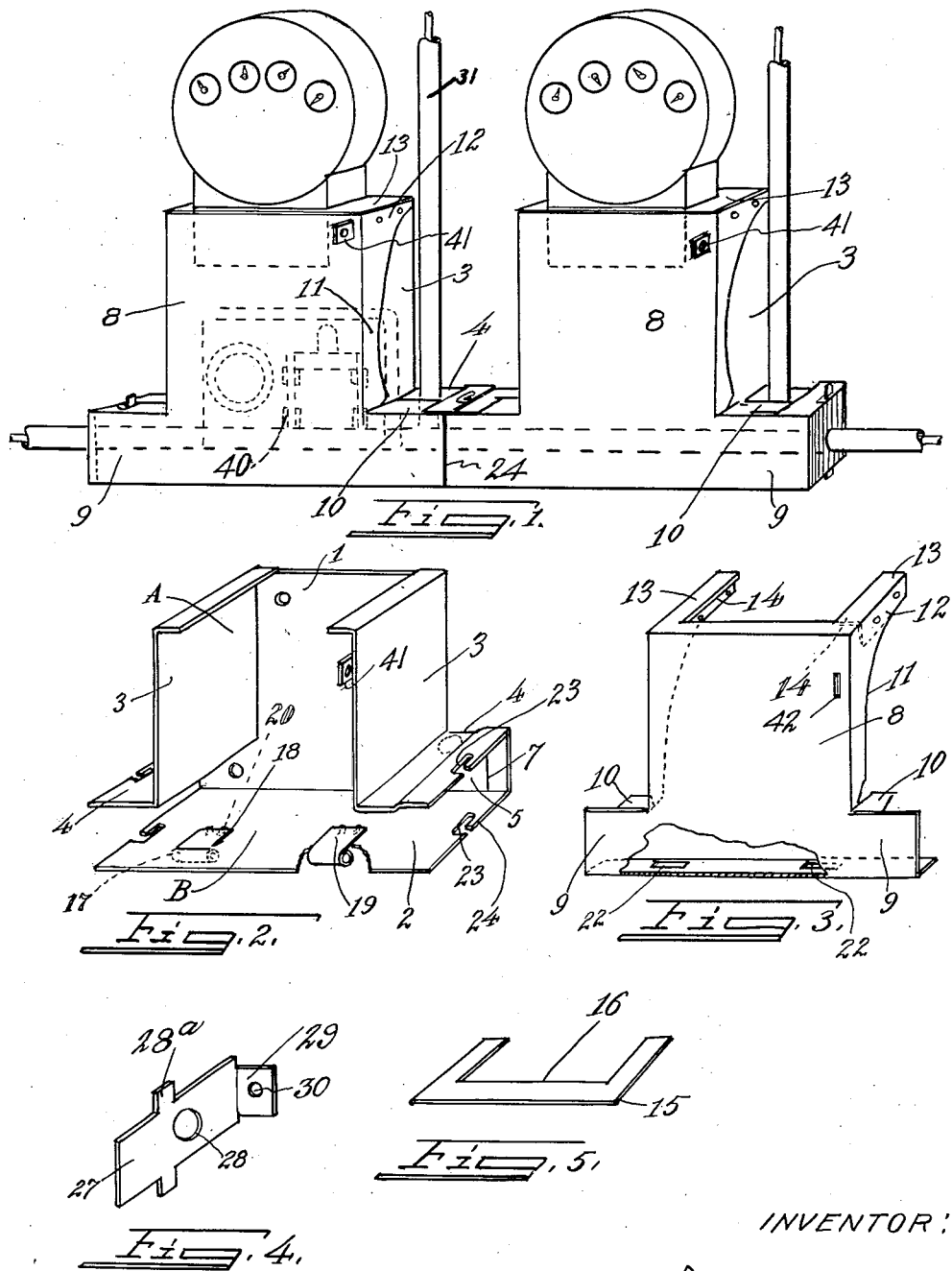
INVENTOR:
George B. Wadsworth.
BY
ATTORNEYS.

Patented Jan. 13, 1925.

1,522,926

UNITED STATES PATENT OFFICE.

GEORGE B. WADSWORTH, OF COVINGTON, KENTUCKY, ASSIGNOR TO THE WADSWORTH ELECTRIC MANUFACTURING COMPANY, OF COVINGTON, KENTUCKY, A CORPORATION OF KENTUCKY.

ELECTRIC TERMINAL CABINET.

Application filed August 7, 1922. Serial No. 580,093.

*To all whom it may concern:*

Be it known that I, GEORGE B. WADSWORTH, a citizen of the United States, and a resident of Covington, in the county of Kenton and State of Kentucky, have invented certain new and useful Improvements in Electric Terminal Cabinets, of which the following is a full, clear, and exact description, reference being had to the accompanying drawings, forming part of this specification.

My invention relates to cabinets for housing the meter blocks for electric service installation, together with the wires or cables leading to and from the meters.

In the installation of electric meters, particularly in numbers of two or more, the present day equipment is expensive and cumbersome. Light and power companies in installing service in apartment or office buildings and power and factory buildings require large cabinets, within which the wiring is done and on the face of which the meter boxes are located. Special devices to serve as conduits for the wires where they are attached to the meters are used, and a type of meter is used which requires a special box of expensive nature.

The present day externally operated switch boxes, which carry the meter, are not desired in connection with the entrance point of the current supply to a large building, but rather an inexpensive and yet fully effective device in which the meter and its connections can be housed and closed up against any tampering. The switch cabinets for the individual user are located elsewhere, and there is no point where current can be obtained without registering on the meter.

It is the object of my invention to provide an entrance cabinet, which combines a conduit with a box, the whole being readily accessible for wiring and capable of being arranged in as many units as are desired.

I thus provide more specifically for a set of combined boxes and conduit sections, which may be telescoped into each other, and for a series of covers which are mounted over the box sections and enclose both box and conduit portions.

In wiring, the entire device is perfectly open and space is left for a test switch to be connected up with the meter when installing the service or whenever it is desired to run a test.

These objects and advantages and other improvements to be noted I accomplish by that certain construction and arrangement of parts to be hereinafter more specifically pointed out and claimed.

In the drawings,

Figure 1 is a perspective view of a set of two units in use.

Figure 2 is a perspective view of a meter mounting section of a single unit.

Figure 3 is a perspective view of the closure section for this unit.

Figure 4 is a perspective view of one of the end closing plates.

Figure 5 is a perspective view of one of the meter terminal block adapters.

The wall sections of my units are formed of sheet metal (preferably) having walls 1, which are screwed to the panel or board and bases 2, which extend forwardly of the walls. The sides of the wall section as indicated at 3, 3, extend from the bases where they flare outwardly as at 4, 4. The walls 4, 4, are preferably parallel with the base, and the back wall 1 is expanded or extended as at 5, 5. This construction forms a body closed at the back, open at the front and top and sides, with a box section A and a conduit section B below the box portion and at both sides of the structure.

The walls 4, 4, are formed differently at each side of the box, so that the right hand wall is bent to a higher level near the end as at 6, while the left hand wall 4 is left straight.

The back wall is also formed with an expanded portion 7, so that if one wall section is brought up against the other, the left hand conduit end of the second section will fit within the right hand conduit end of the first section.

The upper ends of the side walls may be turned in to form flanges which co-operate with any other desired mounting means in retaining a special meter fitting in the wall section. I prefer, however, to carry my meter fittings in the closure sections of the units as will be noted.

The closure sections are formed with front walls 8 expanded at 9 at both lower ends to form in a single sheet a closure for the box and two conduit portions of any wall section. Extending in from each portion 9 is a lip or tongue 10 which lies over the top of the upper conduit walls of the other section and at the sides, as at 11, 11, the metal of the closure sections form walls which taper from a mere flange at the lips 10 to portions the full depth of the box members, as at 12, 12.

The upper edges of these side walls are flanged inwardly, as at 13, 13, and strips 14 are secured, as desired, against the side walls on the inside just below the flanges 13 so as to form slideways for meter fittings.

The meter fittings are in the form of cut-away plates 15 which have cut-away portions, as at 16, of a size to fit over the desired meter terminal block.

The bases of the wall section are slotted at 17 and 18 in two places, inside of the conduit portions, and hinge plates 19 are inserted up through the slots 17 and have two tongues 20 which are thrust down through the slots 18 and bent over.

The bases 21 of the closure sections are formed with slots 22 and the hinge plates are bent over the narrow strips between the slots and the inner edges of the base, thereby forming a simple hinge device.

The ends of the conduit sections are formed at the ends with bayonet slots 23, 23.

When one unit is telescoped onto another and mounted on the panel board, the slots do not register. The closure sections are formed with their left hand extended portions 9 of less dimension than the left hand conduit portions, so that the closures for two units mounted together do not lap each other, but meet on a line as at 24.

For the right or left end of any unit to act as a closure for the conduit, I provide a simple flanged plate device which interlocks and acts to close the conduit and which is held in place by the closure section of the unit to which it is attached.

These closures are formed of plates 27 having knockouts 28 therein and having tongues 28ª to engage the bayonet slots 23 in the conduit ends. The back walls 29 of these units are apertured, as at 30, so that the plates may be screwed down. They are reversible to turn the walls 29 in either direction.

I have not shown the knock-outs, bonding screws and terminals and such like familiar features of any installation for electric wiring, but have shown how an armored conduit 31 may be extended up from the rear of each conduit top wall.

In use a test switch 40 may be inserted into the wall section of the device and the wiring connected with it. The meter terminal block is also arranged in the wall section and the wiring to the meter completed with the terminal block as fully exposed as if no box portions were present. The cover section will then be swung up into place and the ear 41 on the front of the wall section will pass through a slot 42 in the cover section, said ear having a hole therein for a seal or padlock. Instead of a test switch, an externally operated switch could be employed or any other form of circuit control.

The unit is then completely set up and all wiring entirely enclosed, and another unit can be set up in the same manner, being first telescoped into the end of the unit to the left of it.

It will be understood that references to lefts and rights are unimportant and merely made because the drawings happen to show such an arrangement. The shape of the box and cover sections, while resulting in a roomy meter block housing and test switch mounting and a conduit of convenient shape, need not be followed in detail in order to gain the many advantages of my invention.

Having thus described my invention, what I claim as new and desire to secure by Letters Patent, is:—

1. In a device of the character described, a housing member for use in electrical wiring, comprising a box section, a conduit section formed by lateral extensions of the box sections, both of said sections open at the front for full access thereto, and a cover section adapted to close both the box section and the conduit section.

2. In a device of the character described, a housing for a meter terminal block and wiring thereto, said housing formed of separable parts and having a box section in which the meter block is housed, and conduit sections leading to and from the box section and formed by lateral extensions of the box section.

3. In a device of the character described, a plurality of housings for meter terminal blocks and wiring thereto, each of said housings comprising as a unit a box section in which the meter block is housed, and conduit sections leading to and from the box section, said conduit sections being adapted to telescoping engagement, whereby one unit can be inserted in the other, for the purpose described.

4. In combination, a wall section having side walls and a back wall forming a box open at the bottom, top and front, said back wall and side walls being extended at the bottom of the box to form a laterally extending conduit beneath the box, said conduit being open at the ends and the front, and a cover for the wall section adapted to close the front of the box and the front of the conduit, said cover being hinged to the base of the conduit section.

5. A meter installation fixture, comprising essentially a wall box section having a middle opening and two laterally extending openings at the lower end of the middle opening, and a cover section adapted to be secured to the wall section and comprising essentially a plate adapted to close the central and lateral openings.

6. A meter installation fixture, comprising essentially a wall box section having a middle opening and two laterally extending openings at the lower end of the middle opening, and a cover section adapted to be secured to the wall section and comprising essentially a plate adapted to close the central and lateral openings, said two sections forming a central closed compartment, and two lateral compartments open at the end, said fixture being formed with the open end at one of the lateral compartments of different size from the other open end, whereby a series of units may be telescoped into each other.

7. A meter installation fixture, comprising essentially a wall box section having a middle opening and two laterally extending openings at the lower end of the middle opening, and a cover section adapted to be secured to the wall section and comprising essentially a plate adapted to close the central and lateral openings, said two sections forming a central closed compartment, and two lateral compartments open at the end, said fixture being formed with the open end at one of the lateral compartments of different size from the other open end, whereby a series of units may be telescoped into each other, and a removable closure for the open ends, said closure being adapted to be held in place by the cover section.

8. An installation device for meter installation, comprising a series of units telescoped into each other, said units comprising meter block housing portions, and enclosed conduit portions integral therewith, said conduit portions being the telescoped portions of the units.

9. An installation device comprising a back wall shaped as a straight portion with wings extending laterally therefrom at the lower ends, a base portion extending forwardly at the lower edge of the back wall, side walls extending forwardly from the straight portion and thence outwardly parallel with the base portion, with the said outward portions extending along the tops of the lateral wings and a closure movably mounted on the structure above described and adapted to form a wall extending between the base portion and the portions parallel thereto and between the two side walls.

10. An installation device comprising a back wall shaped as a straight portion with wings extending laterally therefrom at the lower ends, a base portion extending forwardly at the lower edge of the back wall, side walls extending forwardly from the straight portion and thence outwardly parallel with the base portion, with the said outward portions extending along the tops of the lateral wings, and a closure movably mounted on the structure above described and adapted to form a wall extending between the base portion and the portions parallel thereto and between the two side walls, said closure formed with an opening of predetermined shape at its upper end, adapted to fit around the block of a meter inserted between the side walls.

11. In a meter fitting and conduit element, a conduit section open along the front, with the top walls of the section extended upwardly between the conduit ends to form side walls of a box and the back wall of the conduit extended upwardly to form the back of said box, and a cover hinged to the conduit and adapted to close the front of the conduit and the front of the box.

12. In a meter fitting and conduit element, a conduit section open along the front, with the top walls of the section extended upwardly between the conduit ends to form side walls of a box and the back wall of the conduit extended upwardly to form the back of said box, and a cover hinged to the conduit and adapted to close the front of the conduit and the front of the box, said conduit section at an end thereof having means for engaging the end of another like section placed side by side therewith.

13. An installation device for electric meters comprising a box having a T-shaped opening therein and a T-shaped cover therefor, said box being provided with lateral openings at the ends of the arms of the T and removable closures for said lateral openings.

14. An installation device for electric meters comprising a box having a T-shaped opening therein and a T-shaped cover therefor, said box being provided with lateral openings at the ends of the arms of the T and removable closures for said lateral openings, one of said lateral openings being formed larger than the other, so that a series of units can be telescoped into each other.

15. A bank of electric service cabinets comprising a plurality of housings, each housing having a section in which a switch is mounted and a conduit section being open to the switch section and open to the conduit section of the next housing in the bank, and said switch and conduit sections being open at the front and covers removably adapted to close completely the switch and conduit sections.

16. A meter cabinet device comprising a back wall, said back wall extended laterally in at least one direction for a limited portion thereof, side walls extending along the back and the extensions thereof, and removable cover sections of the shape of the opening left by the side walls, adapted to close the device except at one end for insertion of a meter terminal block, and at the end of the lateral extension for connection with another like unit.

GEORGE B. WADSWORTH.